(12) United States Patent
Mudd et al.

(10) Patent No.: US 7,203,301 B1
(45) Date of Patent: Apr. 10, 2007

(54) SYSTEM AND METHOD FOR CALL TREATMENT

(75) Inventors: Robert Mudd, Keller, TX (US); Richard Falcone, Addison, TX (US); Lee R. Johnson, Plano, TX (US)

(73) Assignee: Evercom Systems, Inc., Dallas, TX (US)

( * ) Notice: Subject to any disclaimer, the term of this patent is extended or adjusted under 35 U.S.C. 154(b) by 606 days.

(21) Appl. No.: 10/217,149

(22) Filed: Aug. 12, 2002

(51) Int. Cl.
H04M 7/00 (2006.01)
H04M 15/00 (2006.01)
H04M 3/42 (2006.01)

(52) U.S. Cl. ............. 379/220.01; 379/126; 379/207.02

(58) Field of Classification Search ........... 379/220.01, 379/219, 221.08, 229, 230, 114.14, 114.28, 379/127.01, 133, 189, 32.01–5, 207.02, 126
See application file for complete search history.

(56) References Cited

U.S. PATENT DOCUMENTS

| | | | |
|---|---|---|---|
| 5,875,236 A * | 2/1999 | Jankowitz et al. | 379/114.24 |
| 5,963,625 A * | 10/1999 | Kawecki et al. | 379/127.01 |
| 6,029,062 A * | 2/2000 | Hanson | 455/408 |
| 6,064,972 A * | 5/2000 | Jankowitz et al. | 705/7 |
| 6,088,431 A * | 7/2000 | LaDue | 379/114.2 |
| 6,188,751 B1* | 2/2001 | Scherer | 379/88.22 |
| 6,195,422 B1 | 2/2001 | Jones et al. | |
| 6,307,926 B1 * | 10/2001 | Barton et al. | 379/189 |
| 6,373,930 B1 * | 4/2002 | McConnell et al. | 379/114.28 |
| 6,393,113 B1 * | 5/2002 | Karras | 379/133 |
| 2002/0168060 A1 | 11/2002 | Huie | |

OTHER PUBLICATIONS

U.S. Appl. No. 09/640,831, Swope et al.
U.S. Appl. No. 10/135,883, Falcone et al.
U.S. Appl. No. 10/190,315, Falcone et al.

* cited by examiner

Primary Examiner—Benny Quoc Tieu
(74) Attorney, Agent, or Firm—Fulbright & Jaworski LLP

(57) ABSTRACT

Disclosed are systems and methods in which call intelligence, such as may be disposed in communication with signaling systems utilized in controlling calls, is used to provide information for making determinations with respect to the treatment of calls. Call intelligence may be coupled to or disposed within such networks to receive signaling therefrom and/or transmit signaling thereto for determining the appropriate treatment of a call and, preferably, controlling the treatment of a call in accordance with such determination. Signaling messages received by call intelligence may be utilized to determine that a particular calling activity (e.g., enhanced calling service such as call forwarding or three-way calling) is being employed, to collect data with respect to a call, and the like. Signaling messages transmitted by call intelligence of the present invention may be utilized to prevent a call from being setup, to prevent a particular aspect of a call, to provide information to a billing entity for payment, and the like.

30 Claims, 3 Drawing Sheets

SYSTEM AND METHOD FOR CALL TREATMENT

RELATED APPLICATIONS

The present invention is related to co-pending and commonly assigned U.S. patent application Ser. No. 09/640,831 entitled "System and Method for Reverse Billing of a Telephone Call," Ser. No. 10/135,883 entitled "Optimizing Profitability in Business Transactions," filed Apr. 29, 2002, Ser. No. 10/190,315 entitled "Systems and Methods for Offering a Service to a Party Associated with a Blocked Call," filed Jul. 3, 2002, the disclosures of each of which are hereby incorporated herein by reference in their entirety.

TECHNICAL FIELD OF THE INVENTION

The present invention relates generally to call processing and, more particularly, to making call treatment determinations with respect to particular calls.

BACKGROUND OF THE INVENTION

Since the divestiture of North America's telecommunication market, there has been an increase in the amount of participants throughout the various fields of the industry: both facilities and non-facilities based. Additional competitors, e.g., competitive local exchange carriers (CLECs) have joined incumbent local exchange carriers (ILECs), local service providers (LSPs), line resellers, service providers, etc., in the telephony market.

While expanded competition has arguably benefited the public, an undesired result has included many, often confusing, choices of service providers. The increase in competition has also disrupted the fluidity of the telecommunications market that existed before divestiture for both the consumer and the market participant. One area affected by the increased amount of competitors in the telephone market is billing. A customer could potentially receive a separate billing statement for services received from each subscribed telephone service provider. Additionally, some market participants do not have the ability to sufficiently identify the end customer receiving its service.

Convergence or composite billing is an attempt to address and resolve some of thee issues by providing one consolidated communications bill to the customer. The composite bill comprises charges incurred by the customer having a variety of telephone service providers, e.g., local, long distance, Internet, cell phone, paging, alternative billing, etc. This single communication bill is compiled and sent to the customer by a billing entity ultimately responsible for billing the customer. For example, a customer may contract with two different service providers for local and long distance service even though these service providers may be competitors in both local and long distance markets. One of these service providers, or perhaps some other company, may ultimately be responsible as the billing entity for providing one complete telephone communications bill to the customer. The other service providers will receive compensation dependent upon their respective business relationship with the billing entity.

Due to complexities involved with convergence billing, many industry participants may be susceptible to revenue losses because of the inability to identify the ultimate billing entity responsible for billing the party receiving its services. It is important for service providers seeking compensation to adequately identify the billing entity associated with the customer receiving such services to avoid monetary loss resulting from an unpaid service.

Presently, many phone companies utilize a line information database (LIDB) for acquiring information associated with a telephone number. LIDBs provide a variety of information. Some of the information stored in the LIDB relates to billing entities associated with telephone numbers. This information can be obtained directly, or indirectly, from fields such as operating company numbers (OCNs), account owner (AO), originating line number screening (OLNS), line providers, alternative billing services, number portability, calling features, etcetera. Typically, LIDB owners charge a fee to subscribers for accessing the information compiled within the LIDB.

An alternatively billed call, e.g., collect call, is a service provided to telephone customers wherein another party, e.g., called party, is billed for the call as opposed to the calling party or originating line number as are routinely billed. Upon receiving a request for a collect call, the telephone company ultimately responsible for billing the calling party (calling party billing entity), will attempt to identify the billing entity ultimately responsible for billing the called party (called party billing entity). This information is often obtainable through the LIDB. If the identity of the called party billing entity is not obtainable, the caller's telephone company may be reluctant to connect the call between the parties. Because of the risk involved with connecting a collect call to a called party having an unidentified billing entity, many callers' billing entities may choose not to complete the connection for the call and thus, forgo potential revenues. This loss of revenue may be due to the inability to accurately bill for services provided or the perception that the called party to be billed is not a credit worthy consumer. Regardless, potential revenues associated with unbillable and uncollected collect calls are deferred, perhaps never to be realized.

Hence there is a need for a more reliable method of managing the risks of charge backs and unbillable calls where the charges are not billed to the account associated with the line or service of the call originator.

Among the basic building blocks of the PSTN are the switching, signaling, and intelligent network service systems. The switching systems are spread throughout the world primarily as central (local) office switches or service switching points (SSP). These switches connect the line of one party to another party's line or to an outgoing interoffice transmission facility. In addition to switching calls, SSPs also provide usage measurements of calls for billing purposes. Interoffice transmission facilities consist of the physical medium—typically fiber optics or wireless—to connect switching systems.

The signaling system provides the signaling capabilities to establish a call between switching systems. The most common type of signaling used in the PSTN in the United States is referred to as Common Channel Signaling System Number 7 (CCS/SS7 or simply SS7). A telecommunications network that uses SS7 signaling sends signaling messages or packets over a packet network to exchange call control and service information among network elements. SS7 is a key element in supporting a large number of applications in telecommunications networks ranging from call control or basic call setup, to intelligent network services and efficient interconnection of networks.

Intelligent network elements consist of a variety of adjuncts, intelligent peripherals and databases that enable sophisticated services, such as toll free service, calling card services and other intelligent network-based services. Not all networks contain intelligent network capabilities, thus severely limiting the ability of the network operator to provide sophisticated services and maximize their basic network infrastructure.

A particular type of network architecture that most ILECs employ is referred to as an advanced intelligent network (AIN or IN) architecture. Within a basic AIN architecture, the switching, signaling and service network elements may consist of SSPs, signal transfer points (STP) and signaling control points (SCP). In a basic AIN architecture terminals (such as telephones, computers, cell phones, etcetera) are coupled through local loops to SSPs in the central offices. These terminals are then coupled through links to an STP and from there to an SCP.

In practice many other AIN architectures exists having one or more SSPs coupled to one or more STPs. These STPs may in turn be coupled to one or more SCPs which in turn may be coupled to one or more STPs. Any number and type of terminals can be coupled to one or more SSPs.

In these architectures, SSPs are used for switching calls and establishing transmission paths to connect the calling party to a called party. The SSPs formulate and process SS7 messages for call setup and intelligent network services. A conventional SSP formulates two basic types of messages: ISDN user part (ISUP) messages that are used to support basic call set up and transaction capabilities application part (TCAP) messages that are used to support intelligent network services, such as toll free service. These messages typically carry a request or query for information or they carry information responding to a service request.

Generally STPs are packet switches with limited intelligence used to route the signaling messages between network elements. SCPs maintain service logic and database information in support of AIN services.

A Basic Call Model has been developed for describing the processing done by an SSP in connection with the AIN to establish a two-party call. The Call Model identifies various points in call (PICs). PICs are stages of processing a call, beginning with off-hook by the calling party through on-hook by either party. The Call Model consists of half-call models: the originating basic call model (OBCM) and the terminating basic call model (TBCM). Under the AIN Call Model, there are two types of events that cause SSPs to communicate with an SCP during a call, namely triggers and requested events.

Events may occur at certain PICs called detection points (DPs). Triggers specify a condition under which an AIN SSP should suspend call processing and invoke AIN service logic. In response to a trigger the relevant SSP involved with an attempted call queries service logic residing in the relevant SCP to produce instructions for influencing subsequent call processing. For example, an origination attempt trigger detection point (TDP) is encountered after an SSP has received a call setup request. The "off-hook immediate" trigger can be placed at this TDP to initiate a TCAP query to the SCP. The SCP will then contain service logic that instructs the SSP how to process the call. Industry standards have established a basic set of TDPs and triggers.

Events are detected as a result of processing a call. AIN enables an SCP to send a next event list (NEL) of subsequent events that may occur during a call handled by an AIN SSP. Accordingly, when any of the events on the list occurs, the SSP may be required to suspend call processing and launch a query to the relevant SCP.

There are two general types of requested events. A first type of requested event are the event detection point (EDP) requests (EDP-Requests). A second type of requested event are the EDP notifications (EDP-Notifications).

In response to an EDP-Request, an SSP stops call processing, sends an EDP-Request message in a TCAP query to the SCP. The SCP waits for instructions from the SCP for further call handling.

In response to an EDP-Notification the SSP sends an EDP-Notification message to the SCP but the SCP does not await a response from the SCP, which does not respond to the SSP. However, the SSP may record the occurrence of the event. These event and trigger capabilities establish the service and control logic of the SCP.

Simple services that utilize the AIN architecture first invoke a TCAP query to an SCP. The TCAP query is routed through one or more STPs to the appropriate SCP. The SCPs recognize the type of query and acquires the appropriate information to generate a return TCAP response message that is sent back to the originating SSP. The SSP then handles the call accordingly. The action taken in response to a TCAP may be a simple look-up, or more complex service logic that will route the call to different resources (e.g., a different directory number based on a parameter such as time of day or geographic location of the originating call). If the proper information to respond to the TCAP query is not contained in the originating SSP, the originating SSP will launch an ISUP message to setup the call with the interconnecting switches.

The SS7 switching network can thus provide real time call handling with intelligence provided. However, the intelligence provided is (a) not very sophisticated in relation to reducing risks for uncollectable or unbillable calls; and (b) is not readily accessible in a real-time sense from non-ILEC entities without relatively large fees.

BRIEF SUMMARY OF THE INVENTION

The present invention is directed to systems and methods in which call intelligence, such as may be disposed in communication with signaling systems utilized in controlling calls, is used to provide information for making determinations with respect to the treatment of calls. For example, the present invention may provide for use of SS7 and AIN networks to affect the treatment of calls. Call intelligence of the present invention may be coupled to or disposed within such networks to receive signaling therefrom and/or transmit signaling thereto for determining the appropriate treatment of a call and, preferably, controlling the treatment of a call in accordance with such determination. For example, signaling messages received by call intelligence of the present invention may be utilized to determine that a particular calling activity (e.g., enhanced calling service such as call forwarding or three-way calling) is being employed, to collect data with respect to a call, and the like. Signaling messages transmitted by call intelligence of the present invention may be utilized to prevent a call from being setup, to prevent a particular aspect of a call from being implemented, to provide information to a billing entity for payment, and the like.

Embodiments of the present invention may be deployed with respect to a carrier grade network to provide call treatment decisions before a call setup has been completed, thereby allowing for proactive treatment of calls. Moreover, embodiments of the present invention may be utilized with respect to highly transient, mobile, and/or mutable calling and/or called parties.

According to a preferred embodiment, call intelligence of the present invention is disposed at a position or positions in the call network and/or includes data and algorithms such that a positive or negative decision may be made with respect to a call very rapidly. Embodiments of the invention contemplate the use a database for "scoring" call attempts relative to risk of collection based upon active intelligence and organic information (such as OCN, call history, and LIDB facts, etcetera). According to preferred embodiments, such a database is a part of, or in communication with, call intelligence of the present invention and, therefore, may also be resident in the SS7 and AIN networks. In other embodiments of the invention, the SS7 or AIN networks are used in conjunction with the intelligent database and/or other databases in the information layer of the network, to affect the treatment of a call.

Calls for which treatment determinations are provided according to embodiments of the present invention may be calls originating from a particular location (e.g., a particular home or business), facility (e.g., a prison/jail facility), or number (e.g., a particular landline telephone number or wireless telephone number). Additionally or alternatively, calls for which treatment determinations are provided according to the present invention may be calls having a particular signaling characteristic and/or attribute associated therewith. In preferred embodiments, 1010XXX dial around calls by a casual customer may be routed to call intelligence of the present invention as part of call setup or treatment.

For the purposes here, "treatment" with respect to a call means any decision that would be applied to a call attempt or applied to an aspect of a call. Such treatment of a call as provided herein is preferably the a result of obtaining information associated with the call, such as that contained in the SS7 network or AIN, and/or information contained in databases of the present invention, such as are accessible via the SS7 or deployed in an AIN network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
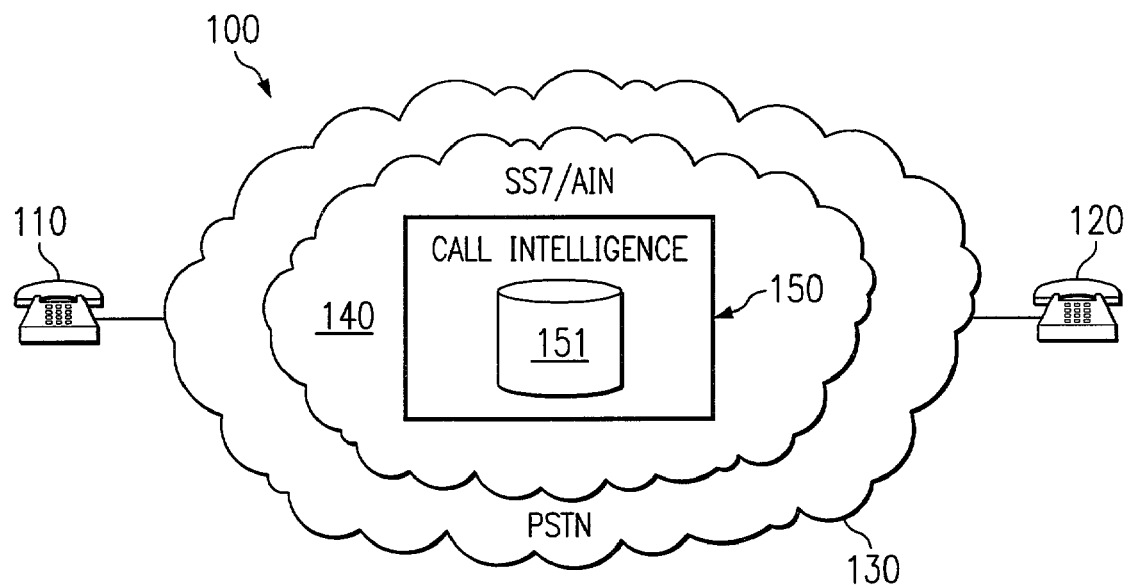
FIG. 1 shows a communication system adapted according to an embodiment of the present invention.

FIG. 1 shows communication system 100 adapted according to an embodiment of the invention. System 100 of FIG. 1 includes terminals 110 and 120 coupled by communication network 130 for providing information communication therebetween. Communication network 130 of the illustrated embodiment comprises the public switched telephone network (PSTN), although embodiments of the present invention may be utilized with alternative or additional communication networks. Communication network 130 of the illustrated embodiment comprises signaling network 140 therein for providing out of band signaling. Signaling network 140 of the illustrated embodiment comprises an AIN, such as using a SS7 network, although embodiments of the present invention may be utilized with alternative or additional signaling networks. It should be appreciated that signaling network 140 may be provided external to communication network 130 or integral thereto, as desired.

In the examples described herein, terminal 110 may be referred to as an originating terminal (i.e., calling party terminal) and terminal 120 may be referred to as a destination terminal (i.e., called party terminal). However, it should be appreciated that either or both such terminals may be utilized in placing an/or receiving calls. Moreover, it should be appreciated that there is no limitation to the use of the two terminals illustrated and, accordingly, any number of terminals may be included with respect to system 100. Similarly, the configuration of the terminals is not limited to that illustrated and, accordingly, the terminals may comprise telephone systems (whether wireline or wireless), computer systems, facsimile systems, pagers, personal digital assistants (PDAs), and/or the like.

Although shown coupled directly to communication network 130, it should be appreciated that one or more of terminals 110 and 120 may be indirectly coupled to a communication and/or signaling network. For example, systems such as a private branch exchange (PBX), call processor, and/or the like may be disposed between a terminal and communication network. Likewise, networks, such as a local area network (LAN), a metropolitan area network (MAN), a wide area network (WAN), an intranet, the Intranet, and/or the like, may be disposed between a terminal and communication network adapted according to the present invention.

Call intelligence 150 of the present invention is preferably coupled to signaling network 140 to receive information therefrom and/or to provide information thereto. The illustrated embodiment of call intelligence 150 comprises database 151. Preferably, database 151 stores information useful in "scoring" call attempts and/or other aspects of a call, such as implementation of particular enhanced calling services (e.g., call forwarding and three-way calling), by call intelligence 150. Such scoring may be based upon active intelligence and/or organic information. Accordingly, database 151 may comprise information such as operating company numbers, account owner, originating line number screening, dialed number information, call detail records, line providers, alternative billing services, number portability, calling features, call history, law enforcement information, and/or the like.

Scoring of calls by call intelligence 150 may be relative to risk of collection of payment with respect to the call. Accordingly, call intelligence 150 may provide positive and negative information and/or control signals with respect to setting up a call, continuing a call, etcetera in real time to systems of networks 130 and/or 140. Additionally or alternatively, call intelligence 150 may provide information, whether positive or negative, to systems of networks 130 and/or 140 for use with respect to future calls. Such information might be stored locally with respect to systems of networks 130 and/or 140 for use thereby as needed. Additional detail with respect to call scoring, determinations with respect to allowing a call to be made, metrics used in scoring a call, and the like are shown in the above referenced patent application entitled "Optimizing Profitability in Business Transactions," previously incorporated herein by reference.

In the illustrated embodiment call intelligence 150 is disposed within signaling network 140. For example, where signaling network 140 comprises a SS7 AIN, call intelligence 150 may be coupled to or operable upon a SCP. A SCP may provide an address, such as an internet protocol (IP) address, for directing queries to call intelligence 150 of the present invention from SSPS, STPs, SCPs, and/or other devices of signaling network 140 operating to control various aspects of a call between terminals 110 and 120. Accordingly, a SCP may provide a gateway between call intelligence 150 and networks 130 and/or 140.

Figure 2:
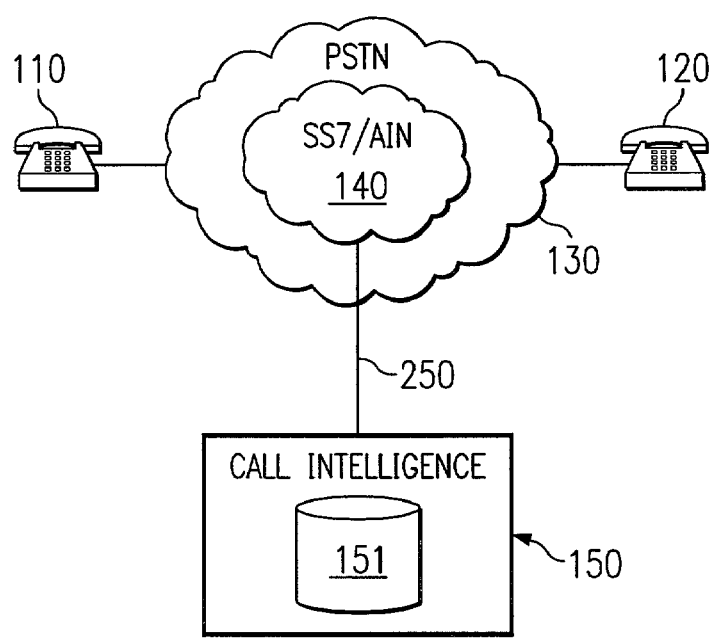
FIG. 2 shows a communication system adapted according to an alternative embodiment of the present invention.

According to one embodiment of the present invention, call intelligence 150 is implemented as an instruction set and associated data, e.g., database 151, operable upon a processor-based platform of a SCP. Alternatively, call intelligence 150 may be linked to a system of signaling network 140, such as using a data link coupled to a SCP. One such configuration of this alternative embodiment is shown in FIG. 2 wherein call intelligence 150 is coupled to signaling network 140 via data link 250. Data link 250 may comprise a network such as a LAN, MAN, WAN, an intranet, the Internet, and/or the like. Call intelligence 150 of FIG. 2 may be coupled to a SCP (not shown), such as a LS-SCP, or other system providing a signaling gateway integrating disparate networks and/or network protocols.

Figure 3:
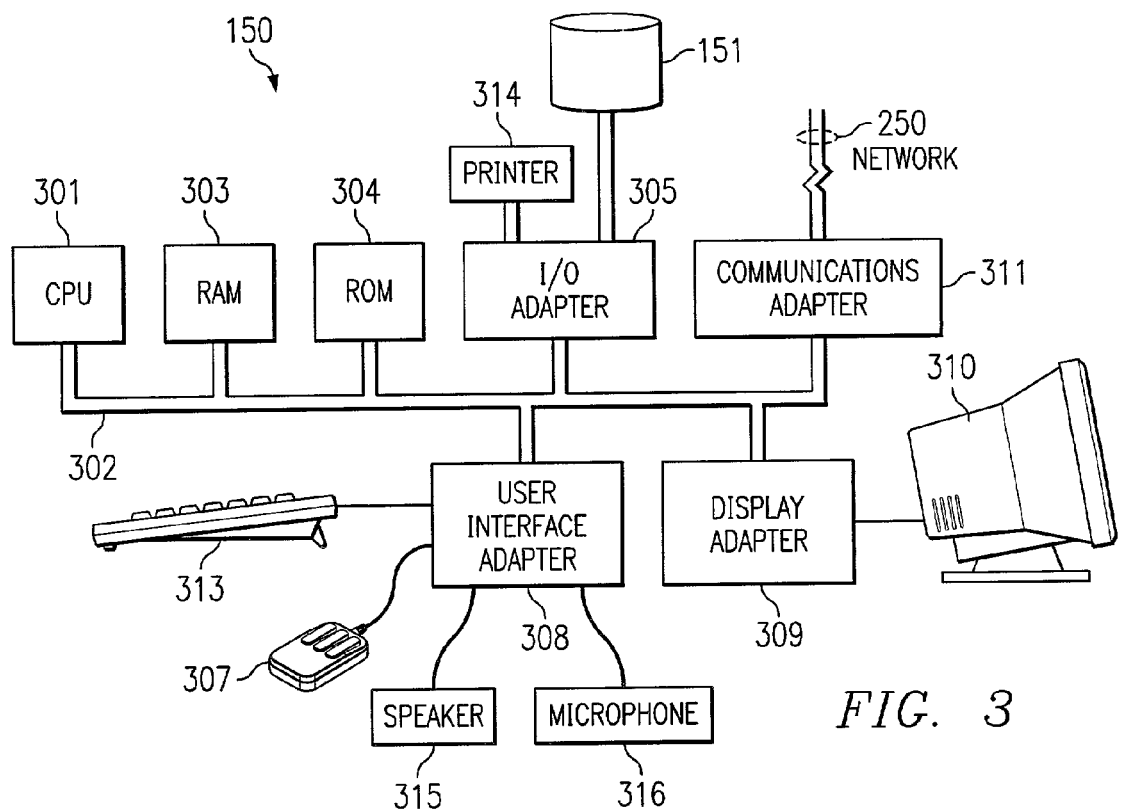
FIG. 3 shows a block diagram of a processor-based system which is adapted to implement call intelligence according to an embodiment of the present invention.

Directing attention to FIG. 3, a block diagram of an embodiment of call intelligence 150 is shown. The components of call intelligence 150 of FIG. 3 may correspond to a processor-based system coupled to signaling network 140 as illustrated in FIG. 2 or may correspond to a processor-based SCP upon which an instruction set and data defining operation as described herein is operable. Central processing unit (CPU) 301 of the illustrated embodiment of call intelligence 150 is coupled to system bus 302. CPU 301 may be any general purpose CPU, such as an Intel PENTIUM processor. However, the present invention is not restricted by the architecture of CPU 301 as long as CPU 301 supports the inventive operations as described herein. Bus 302 of the illustrated embodiment is coupled to random access memory (RAM) 303, which may be SRAM, DRAM, SDRAM, etcetera. ROM 304, which may be PROM, EPROM, EEPROM, etcetera, is also coupled to bus 302 in the illustrated embodiment. RAM 303 and ROM 304 hold data and programs, such as an instruction set and associated data of the present invention.

Bus 302 of the illustrated embodiment is also coupled to input/output (I/O) controller 305, communications adapter 311, user interface adapter 308, and display adapter 309. I/O adapter 305 preferably connects to storage devices, e.g., one or more of a hard drive, a CD drive, a floppy disk drive, a tape drive, such as may comprise database 151 of the present invention. I/O adapter 305 of the illustrated embodiment is also connected to printer 314, which would allow the system to print or otherwise output information. Note that the printer may be a printer (e.g. dot matrix, laser, etc.), a fax machine, a copy machine, and/or the like. Communications adapter 311 is adapted to couple call intelligence 150 to a network, such as via data link 250. User interface adapter 308 may be utilized to couple user input devices, such as keyboard 313, pointing device 307, and microphone 316, to call intelligence 150. User interface adapter 308 may also be utilized to provide output, such as sound output via speaker 315. Display adapter 309 may be driven by CPU 301 to control the display on display device 310.

It should be appreciated that when implemented in software, elements of the present invention may be essentially code segments to perform the necessary tasks. The program or code segments can be stored in a computer readable medium or transmitted by a computer data signal embodied in a carrier wave, or a signal modulated by a carrier, over a transmission medium. The computer readable medium may include any medium that can store or transfer information. Examples of a computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etcetera.

Figure 4:
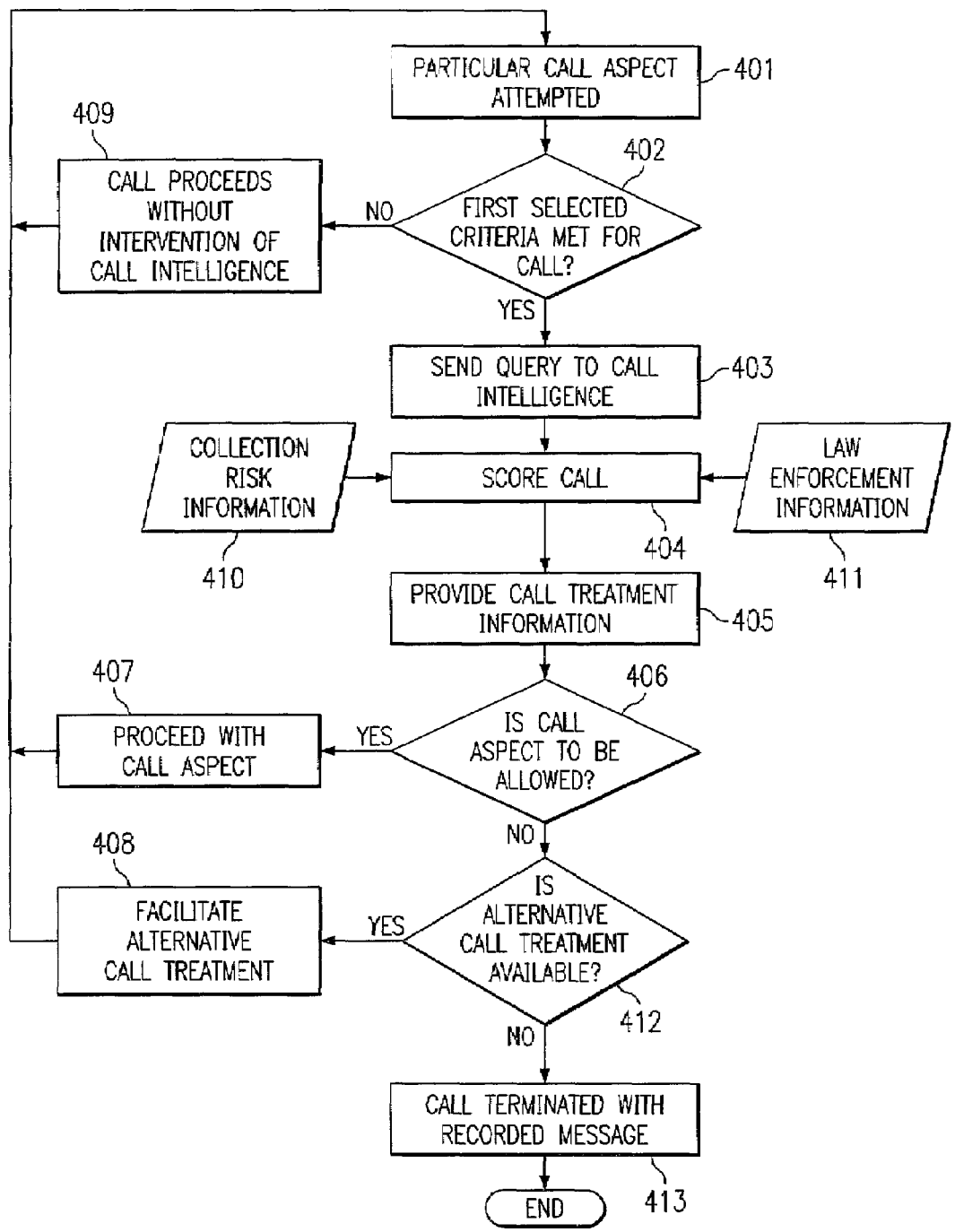
FIG. 4 shows a flow diagram of operation according to an embodiment of the present invention.

FIG. 4 illustrates preferred embodiment steps for call treatment by call intelligence of the present invention. In performing the steps illustrated in FIG. 4, call intelligence 150 may be provided in direct connection with a SS7 network through SS7 signal protocols such that the call intelligence is accessible through the PSTN. For example, as various aspects of a call, such as call setup, three-way calling, or call forwarding, are implemented with respect to a particular call by communication network 130, various systems of the signaling network, such as those involved in events comprising particular DPs of a call, may access call intelligence of the present invention.

In operation according to the illustrated embodiment, a particular aspect of a call is attempted at step 401. For example, a user of terminal 110 (FIG. 1) may attempt to place a call to a particular number, such as that associated with terminal 120 (FIG. 1). Alternatively, a particular call aspect of a call already in progress may be attempted. For example, a call may be in progress between terminals 110 and 120 and a user attempts to invoke an enhanced calling service such as three-way calling. Similarly, a call which is being setup between terminals 110 and 120 may be automatically redirected to a different terminal because a user of terminal 120 has previously invoked call forwarding. Particular ones of such call aspects may be detected according to the present invention, such as to minimize unbillable/uncollectable revenue risk, to prevent utilization of particular calling aspects with respect to certain users, locations, lines, etcetera. Accordingly, DPs associated with the call may be utilized to recognize a particular call aspect being attempted or implemented, such as by a SSP, STP, SCP, and/or other device of signaling network 140 (FIG. 1).

Preferably a determination is made as to whether the call meets a first selected criteria for call intelligence processing according to the present invention. For example, call intelligence processing may be provided with respect to calls being placed to and/or from a particular number, line, location, etcetera, calls for which a particular aspect is being attempted, calls having been identified for call intelligence processing, and/or the like. For collect calls, calls made from correctional facilities, calls made on a 1010XXX, 900, or other basis where risk of collection is relatively high, the first selected criteria may be provided by the destination number, the service code, or otherwise by a service provider and the second selected criteria is a risk that no collection can be made on the attempted call if completed. According to one embodiment of the present invention, call intelligence processing is implemented with respect to calls placed from a particular facility, such as a prison facility. Therefore, a device of signaling network 140 may recognize a call origination attempt from the facility as meeting the first selected criteria. Additionally or alternatively, embodiments of the present invention may be implemented with respect to calls being placed to a particular individual, such as a crime victim or judge. Therefore, a device of signaling network 140 may recognize a call origination attempt to such an individual, e.g., the individual's number, location, etcetera, as meeting the first selected criteria.

It should be appreciated that determinations with respect to a first selected criteria being met for a call may include determinations of multiple orders. For example, it may first be determined that a call is a candidate for call intelligence processing and then the particular call aspect being attempted analyzed to determine if call intelligence processing is desired. Similarly, it may be determined that a call is a candidate for call intelligence processing and then local information, such as a previous positive or negative response from call intelligence 150 associated with the current call in some way (e.g., line, number, location, etcetera) stored at a device of signaling network 140, analyzed to determine if call intelligence processing is desired. Such multiple order determinations may be particularly useful in expeditiously treating subsequent calls where a negative call treatment response has been previously provided by call intelligence processing, without further processing by call intelligence 150. Additionally or alternatively, such multiple order determinations may be useful in providing for call treatment according to the present invention at various points throughout a call.

According to the illustrated embodiment, if it is determined that the first selected criteria is not met with respect to the call, processing proceeds to step 409 wherein the call proceeds without intervention of call intelligence 150. Proceeding with respect to the call may encompass allowing the particular call aspect attempted to be implemented and, therefore, the call to proceed. Accordingly processing may again return to step 401 to identify subsequent attempts to implement a particular call aspect with respect to that call. Additionally or alternatively proceeding with respect to the call may encompass a device of signaling network 140 terminating the call. For example, where the first selected criteria is determined not to have been met due to previous negative call treatment information having been provided by call intelligence 150, proceeding with the call at step 409 may provide for playing a recorded message announcing a reason for terminating the call (similar to that of step 413 discussed below) and the call may be terminated.

If, however, it is determined that the first selected criteria is met with respect to the call, processing according to the illustrated embodiment proceeds to step 403. At step 403 a query associated with the attempted call may be made to call intelligence 150, such as using signaling protocols of signaling network 140. The query may include information such as information with respect to the originator of the call (e.g., number, location, line, account, central office, etcetera), information with respect to the call destination (e.g., number, location, line, account, central office, etcetera), information with respect to the aspect of the call being attempted or implemented (e.g., call setup, three-way calling, call forwarding, etcetera), and/or like information.

Call intelligence 150 of the preferred embodiment scores the call for treatment according to the present invention at step 404. Such scoring may be based upon second criteria. For example, criteria used in scoring a call according to the present invention may comprise information provided in the aforementioned query. However, criteria used in call scoring according to preferred embodiments of the present invention additionally or alternatively comprises information indicative of collection risk, e.g., operating company numbers, account owner, originating line number, dialed number information, call detail records, line providers, alternative billing services, number portability, call history, etcetera, (box 410) and/or law enforcement information, e.g., whether or not to complete the call based upon legal restrictions, whether or not to monitor the call, etcetera, (box 411), such as may be provided by database 151. A decision metric is preferably applied by call intelligence 150 to the query to accomplish the scoring relative to the second criteria. Detail with respect to call scoring is shown in the above referenced patent application entitled "Optimizing Profitability in Business Transactions," previously incorporated herein by reference.

It should be appreciated that a decision metric could be formed based upon a query of criteria embodied in multiple databases within the AIN and the criteria comprising a determination on whether or not and how to complete the requested call in consideration of a plurality of pre-selected factors stored in the particular database handling the call.

Call intelligence 150 may provide, such as through the SS7 network, either a raw score for return to the query control or a command determination of how to treat the call based upon the scoring (step 405). For example, call treatment information provided by call intelligence 150 may simply be a positive or negative acknowledgement, indicating that the attempted call aspect should be allowed or prevented. Alternatively, call treatment information provided by call intelligence 150 may be a scoring metric utilized by a receiving device in determining desired treatment of the call.

A device or devices of the signaling network preferably receive the call treatment information provided by call intelligence 150 and make a determination as to whether the call aspect is to be allowed or implemented (step 406). Where the call treatment information is a scoring metric, for example, a device of signaling network 140 may implement an algorithm to determine if the scoring metric indicates the attempted call aspect should be allowed/invoked. Where the call treatment information is a positive/negative acknowledgement, a device of signaling network 140 may make a branching decision without further processing of the information.

If the call treatment information provided by call intelligence 150 indicates the particular attempted call aspect should be allowed, processing preferably proceeds to step 407 wherein communication network 130 and/or signaling network 140 operate to allow/implement the call aspect. For example, if the call aspect was setting up of a call based upon a new call origination, call setup may be allowed to proceed to thereby place terminal 110 in communication with terminal 120. Likewise, if the call aspect was a user invoking three-way calling, call setup with respect to the third party may be allowed to proceed to thereby place terminals 110 and 120 in communication with a third terminal (not shown). Processing may again return to step 401 from step 407 to identify subsequent attempts to implement a particular call aspect with respect to that call.

If the call treatment information provided by call intelligence 150 indicates the particular attempted call aspect should not be allowed, processing preferably proceeds to step 412 where a determination may be made as to whether an alternate call treatment is available. For example, where a call aspect is prevented due to a call score indicating an unacceptably high collection risk, alternative call payment techniques may be available to facilitate the call with acceptable risk. Accordingly, processing may proceed from step 412 when it is determined that alternate call treatment is available to step 408 wherein the alternative call treatment is facilitated. Examples of facilitation of such alternative call treatment are shown and described in the above referenced patent applications entitled "System and Method for Reverse Billing of a Telephone Call" and "Systems and Methods for Offering a Service to a Party Associated with a Blocked Call," previously incorporated herein by reference. Processing may again return to step 401 from step 408 to identify subsequent attempts to implement a particular call aspect with respect to that call.

Processing may proceed from step 412 when it is determined that alternate call treatment is not available to step 413 wherein a recorded message is played to announce that the attempted call aspect will not be implemented and/or to announce that the call will be terminated. Thereafter, attempts to implement the attempted call aspect, or perhaps the call itself, may be terminated. Of course, there is no requirement that a message be played according to the present invention.

It should be appreciated that embodiments of the present invention may operate to proceed with particular call aspects in a particular way according to the call treatment information provided by call intelligence of the present invention. For example, call treatment information of the present invention may indicate that an attempted call aspect, such as setting up a new call, should be allowed in a substantially typical fashion, but that additional call processing, such as notifying a law enforcement agency of the call, recording the call, providing call detail information to a system for call accounting, and/or the like, should be accomplished according to the present invention. Accordingly, step 407 may operate to perform call processing in addition to or in the alternative to proceeding with the particular call aspect attempted in response to call treatment information of the present invention.

Figure 5:
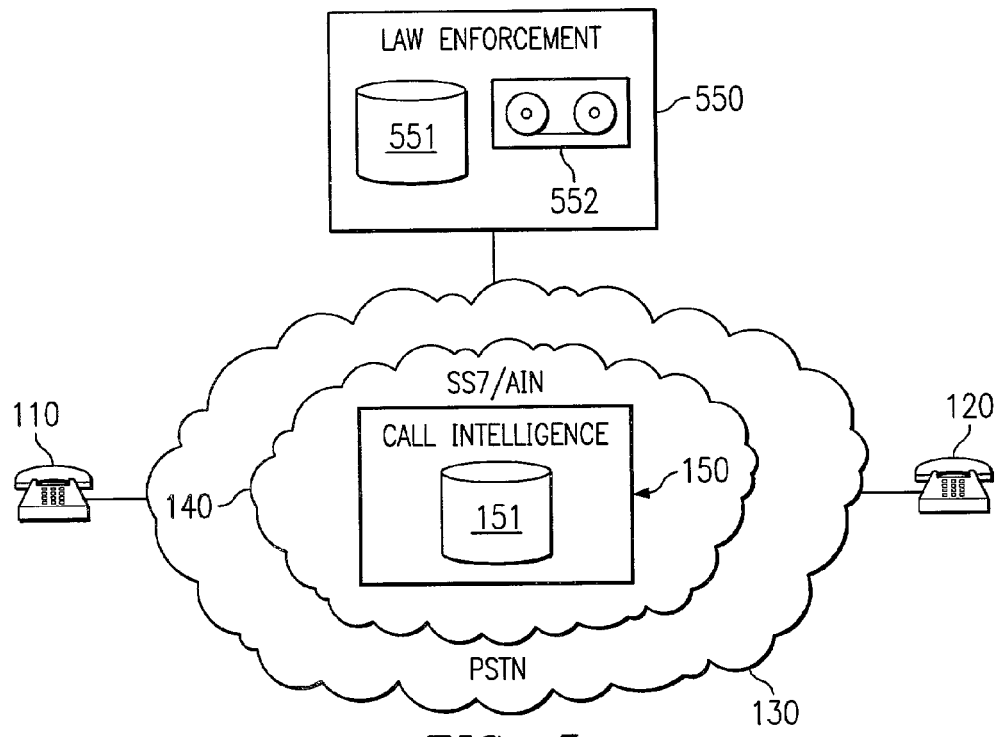
FIG. 5 shows a communication system adapted according to an embodiment of the present invention.

Directing attention to FIG. 5, an embodiment providing call processing in addition to proceeding with the particular call aspect attempted in response to call treatment information is shown. In the embodiment of FIG. 5 in addition to allowing a new call origination to be setup, additional call routing is provided based upon criteria relevant to the particular call, such as a particular origination or destination number, a particular class of calls or originating or destination numbers, etcetera. The additional call routing of the illustrated embodiment results in coupling such selected calls from an originating central office to a particular destination, such as law enforcement 550, in addition to or in the alternative to setting up the call as desired by the caller.

For example, selected calls may be routed to destination 550 to aid law enforcement or investigation of criminal activity with respect to the call. In a preferred embodiment a call processor (not shown) at an inmate facility (e.g., jail or correctional facility) places an identifier on outbound inmate calls relative to the destination or origination number for all or pre-selected numbers originating from or calling into a correctional facility or jail. For example, the identifier could be an AINI number associated with the inmate facility calls. Based upon the identifier, SCPs, such as under control of call intelligence of the present invention, may set up the call to be routed to law enforcement 550. For example the call could be tapped and monitored, e.g., recorded via recorder 552, and/or further analyzed, e.g., using law enforcement database 551, while still being completed. The call could also be blocked or terminated, perhaps responding with a recorded message supplied either by the call processor, call intelligence 150, or the PSTN. Of course, call intelligence 150 may identify and/or make determinations regarding treatment of a call, including performing call processing in addition to or in the alternative to proceeding with the particular call aspect attempted, without the use of the aforementioned identifier, if desired.

Similar to the embodiment illustrated in FIG. 5, call intelligence may determine that a particular call is associated with a pre-paid account or is to be billed to a particular account (e.g., a number which is neither the calling nor called number). Accordingly, in addition to allowing a new call origination to be setup, additional call routing to provide call detail to an appropriate accounting or billing system, such as may be coupled to communication network 130 and/or signaling network 140 similar to law enforcement 550, may be provided at step 408 according to embodiments of the present invention.

Although preferred embodiments have been described above with reference to call intelligence of the present invention being coupled to communication and signaling networks for receiving call treatment queries and providing call treatment information, it should be appreciated that other information may be exchanged therebetween according to embodiments of the present invention. For example, call intelligence of the present invention may monitor various aspects of the operation of communication network 130 and/or signaling network 140, such as to populate/update database 151. Similarly, call intelligence of the present invention may be linked to other informational databases (e.g. a LIDB in the AIN) for populating/updating information in database 151, such as on a pre-selected interval or event. Accordingly, call intelligence 150 of the preferred embodiment may collect and/or provide call detail records in real-time, thereby eliminating the need to wait for a LEC or other provider to compile and provide such records.

Moreover, it should be appreciated that call intelligence of the present invention is not limited to communication with, or providing call intelligence processing with respect to, devices of the communication and/or signaling networks. For example, facilities having premise-based call processing suffer from disadvantages associated with fraud control, validation, unbillable calls, and unavailability of real-time data and services available on the SS7/AIN networks. Accordingly, call intelligence of the present invention may be coupled to such systems, such as via a signaling gateway, to provide call intelligence with respect thereto. Additionally or alternatively, such call processors and facilities management databases may be coupled to the SS7 and/or AIN networks through a signaling gateway to provide such advantages as real-time linkage with law enforcement or multi-facility management.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing a call in a communication network, said method comprising:
    identifying an aspect of a particular call for determining an appropriate treatment of said call, said particular call being selected based at least in part upon a first criteria, wherein said aspect comprises an enhanced calling service;
    routing a query to call intelligence, said call intelligence coupled to systems of said communication network; and
    scoring said call with respect to said aspect by said call intelligence based at least in part upon a second criteria.

2. The method of claim 1, wherein said communication network comprises a telecommunications carrier grade network.

3. The method of claim 1, wherein said enhanced calling service comprises three-way calling.

4. The method of claim 1 wherein said enhanced calling service comprises call forwarding.

5. The method of claim 1, wherein said first criteria comprises information with respect to an originator of said call.

6. The method of claim 5, wherein said information with respect to said originator of said call comprises information selected from the group consisting of an originating number, an originating location, an originating facility, and an originating central office.

7. The method of claim 1, wherein said first criteria comprises information with respect to an intended destination of said call.

8. The method of claim 7, wherein said information with respect to said intended destination of said call comprises information selected from the group consisting of a destination number, a destination location, and a destination central office.

9. The method of claim 1, wherein said first criteria comprises information indicating that said call is a call selected from the set consisting of a collect call, a 1010XXX call, a debit call, and a credit card call.

10. The method of claim 1, wherein said query comprises information with respect to an originator of said call.

11. The method of claim 1, wherein said query comprises information with respect to a destination of said call.

12. The method of claim 1, wherein said query comprises information with respect to said aspect.

13. The method of claim 1, wherein said call intelligence comprises an instruction set operable upon a processor-based system of said communication network.

14. The method of claim 13, wherein said communication network comprises the public switched telephone network and said processor-based system comprises a signaling control point.

15. The method of claim 1, wherein said call intelligence comprises a processor-based system coupled to said communication network.

16. The method of claim 15, wherein said communication network comprises the public switched telephone network and said processor-based system is coupled to a signaling control point of said public switched telephone network.

17. The method of claim 1, wherein said scoring provides an affirmative/negative acknowledgement with respect to said aspect.

18. The method of claim 1, wherein said scoring is relative to revenue collection risk associated with said call.

19. The method of claim 1, wherein said second criteria comprises collection risk information.

20. The method of claim 19, wherein said collection risk information is selected from the group consisting of operating company numbers, account owner, originating line number, dialed number information, call detail records, line providers, alternative billing services, number portability, and call history.

21. The method of claim 1, further comprising:
    providing call treatment information to a system of said communication network as a function of said scoring; and
    controlling implementation of said aspect based at least in part upon said call treatment information.

22. The method of claim 21, wherein said call treatment information comprises an affirmative/negative acknowledgement with respect to said aspect.

23. The method of claim 21, wherein said call treatment information comprises raw scoring information.

24. The method of claim 21, wherein said controlling implementation of said aspect comprises determining if an alternative call treatment is available.

25. The method of claim 21, wherein said controlling implementation of said aspect comprises preventing implementation of said aspect.

26. The method of claim 21, wherein said controlling implementation of said aspect comprises allowing implementation of said aspect.

27. The method of claim 21, wherein said controlling implementation of said aspect comprises providing call processing in addition to said aspect.

28. The method of claim 27, wherein said call processing in addition to said aspect comprises providing call detail information to an accounting system.

29. The method of claim 1, further comprising:
    collecting call detail record information by said call intelligence.

30. The method claim 1, further comprising:
    linking said call intelligence to an informational database of said communication system; and
    updating information in said call intelligence from said informational database.

* * * * *